US012682917B2

(12) United States Patent
Hagiyama et al.

(10) Patent No.: US 12,682,917 B2
(45) Date of Patent: Jul. 14, 2026

(54) IMPRESSION FORMATION CONTROL DEVICE, METHOD AND PROGRAM

(71) Applicant: NTT, Inc., Tokyo (JP)

(72) Inventors: Naoki Hagiyama, Musashino (JP); Mana Sasagawa, Musashino (JP); Ayaka Sano, Musashino (JP); Shunichi Seko, Musashino (JP); Rika Mochizuki, Musashino (JP); Yuki Kurauchi, Musashino (JP); Harumi Saito, Musashino (JP); Ryuji Yamamoto, Musashino (JP)

(73) Assignee: NTT, Inc., Tokyo (JP)

( * ) Notice: Subject to any disclaimer, the term of this patent is extended or adjusted under 35 U.S.C. 154(b) by 171 days.

(21) Appl. No.: 18/843,723

(22) PCT Filed: Mar. 25, 2022

(86) PCT No.: PCT/JP2022/014642
§ 371 (c)(1),
(2) Date: Sep. 4, 2024

(87) PCT Pub. No.: WO2023/181404
PCT Pub. Date: Sep. 28, 2023

(65) Prior Publication Data
US 2025/0182777 A1     Jun. 5, 2025

(51) Int. Cl.
*G10L 25/51*     (2013.01)
*G10L 13/02*     (2013.01)
(Continued)

(52) U.S. Cl.
CPC .............. *G10L 25/51* (2013.01); *G10L 13/02* (2013.01); *G10L 17/26* (2013.01); *G10L 25/60* (2013.01); *G10L 25/63* (2013.01)

(58) Field of Classification Search
CPC ......... G10L 25/60; G10L 25/51; G10L 25/63; G10L 13/02; G10L 17/26
See application file for complete search history.

(56) References Cited

U.S. PATENT DOCUMENTS

2009/0265170 A1* 10/2009 Irie .......................... G10L 17/26
                                                      704/236
2017/0194019 A1*  7/2017 Derrick ................... G10L 21/06
(Continued)

OTHER PUBLICATIONS

Ackerman et al., "Incidental Haptic Sensations Influence Social Judgments and Decisions," Science, Jun. 2010, 328(5986):1712-1715.

(Continued)

*Primary Examiner* — Samuel G Neway
(74) *Attorney, Agent, or Firm* — Fish & Richardson P.C.

(57) ABSTRACT

According to an embodiment of the present invention, when impression formation for a listener with respect to a speaker is controlled, a speech voice signal of the speaker is acquired, a voice feature is extracted from the speech voice signal, a bias to an impression made on the listener by the speech voice signal is determined based on the extracted voice feature, a bias control signal for controlling the bias occurs based on a determination result of the bias and information indicating a preset control direction of the bias, and a stimulation control signal for giving external stimulation to the listener is generated in accordance with the bias control signal, and the generated stimulation control signal is output.

6 Claims, 7 Drawing Sheets

(51) Int. Cl.

| | |
|---|---|
| *G10L 17/26* | (2013.01) |
| *G10L 25/60* | (2013.01) |
| *G10L 25/63* | (2013.01) |

(56) References Cited

U.S. PATENT DOCUMENTS

| | | | |
|---|---|---|---|
| 2017/0206915 A1* | 7/2017 | Prasad | G10L 25/63 |
| 2019/0180771 A1* | 6/2019 | Yin | G10L 15/22 |
| 2019/0198041 A1* | 6/2019 | Hori | G06Q 10/40 |
| 2025/0182777 A1* | 6/2025 | Hagiyama | G10L 13/02 |

OTHER PUBLICATIONS

Eyben et al., "openSMILE—The Munich versatile and fast open-source audio feature extractor," MM '10: Proceedings of the 18th ACM international conference on Multimedia, Firenze, Italy, Oct. 25-29, 2010, 1459-1462.

Ijzerman et al., "The Thermometer of Social Relations: Mapping Social Proximity on Temperature," Psychological Science, Oct. 2009, 20(10):1214-1220.

Okada, "The effect of voice pitch on forming impressions of politicians: An experimental study using female voices using voice synthesis software," Applied Sociology Research, 2016, 58:53-66, 29 pages (with machine translation).

Sasagawa et al., "A Food Texture Display With Hardness and Shape by Jamming," Journal of Information Processing Society of Japan, Feb. 2019, 60(2):376-384, 19 pages (with machine translation).

Uchida, "Effects of intonation contours in speech upon the image speakers' personality," Psychological Research, Oct. 2005, 76(4):382-390, 19 pages (with machine translation).

Uchida, "Effects of the speech rate on speakers' personality-trait impressions," The Japanese Journal of Psychology, Jun. 2002, 73(2):131-139, 19 pages (with machine translation).

* cited by examiner

IMPRESSION FORMATION CONTROL DEVICE, METHOD AND PROGRAM

CROSS-REFERENCE TO RELATED APPLICATIONS

This application is a National Stage application under 35 U.S.C. § 371 of International Application No. PCT/JP2022/014642, having an International Filing Date of Mar. 25, 2022, the disclosure of which is considered part of the disclosure of this application, and is incorporated by reference in its entirety into this application.

TECHNICAL FIELD

One embodiment of the present invention relates to an impression formation control device, method and program for controlling impression formation for a listener to a speaker, for example.

BACKGROUND ART

It is known that the voice of a speaker has an influence on impression formation for listeners such as reliability and favorability of the speaker. For example, in NPL 1, it has been reported that the voice pitches of politicians who are speakers is related to impression formation for the politicians. Specifically, it has been reported that a listener evaluates favorability and reliability of a politician higher as a fundamental frequency of the voice of the politician is lower (a positive bias occurs in evaluation), and the listener evaluates the favorability and the reliability of the politician lower as the fundamental frequency of the voice of the politician is higher (a negative bias occurs in evaluation). In NPL 1, it is described that impression formation for a listener with respect to a politician can be controlled through a voice operation using a voice synthesis technique.

CITATION LIST

Non Patent Literature

[NPL 1] Yosuke Okada, "The Effect of Voice Pitch on Evaluation of Politician: An Examination Using Voice Synthesis Software", The journal of applied sociology, vol. 58, pp. 53 to 66, 2016.

SUMMARY OF INVENTION

Technical Problem

Incidentally, if impression formation for a listener with respect to a speaker is controlled using a synthesized voice as in NPL 1, a voice feature is altered. Therefore, an intention of the speaker may not be correctly transmitted to a listener.

The present invention has been devised in view of the foregoing circumstances, and an object of the present invention is to provide a technique that can control impression formation for a listener with respect to a speaker without altering an intention of the speaker.

Solution to Problem

In order to solve the above problem, in an impression formation control device or method according to an aspect of the present invention, when impression formation for a listener with respect to a speaker is controlled, a speech voice signal of the speaker is acquired, a voice feature is extracted from the speech voice signal, a bias to an impression made on the listener by the speech voice signal is determined based on the extracted voice feature, a bias control signal for controlling the bias occurs based on a determination result of the bias and information indicating a preset control direction of the bias, and a stimulation control signal for giving external stimulation to the listener is generated in accordance with the bias control signal, and the generated stimulation control signal is output.

Advantageous Effects of Invention

According to one aspect of the present invention, a technique capable of controlling impression formation for a listener to a speaker without changing an intention of the speaker can be provided.

DESCRIPTION OF EMBODIMENTS

Hereinafter, an embodiment according to the present invention will be described with reference to the drawings.

EMBODIMENT (Configuration Example)

In an embodiment of the present invention, a case where a lecture, a seminar, or the like is performed via a network will be described as an example.

(1) System

Figure 1:
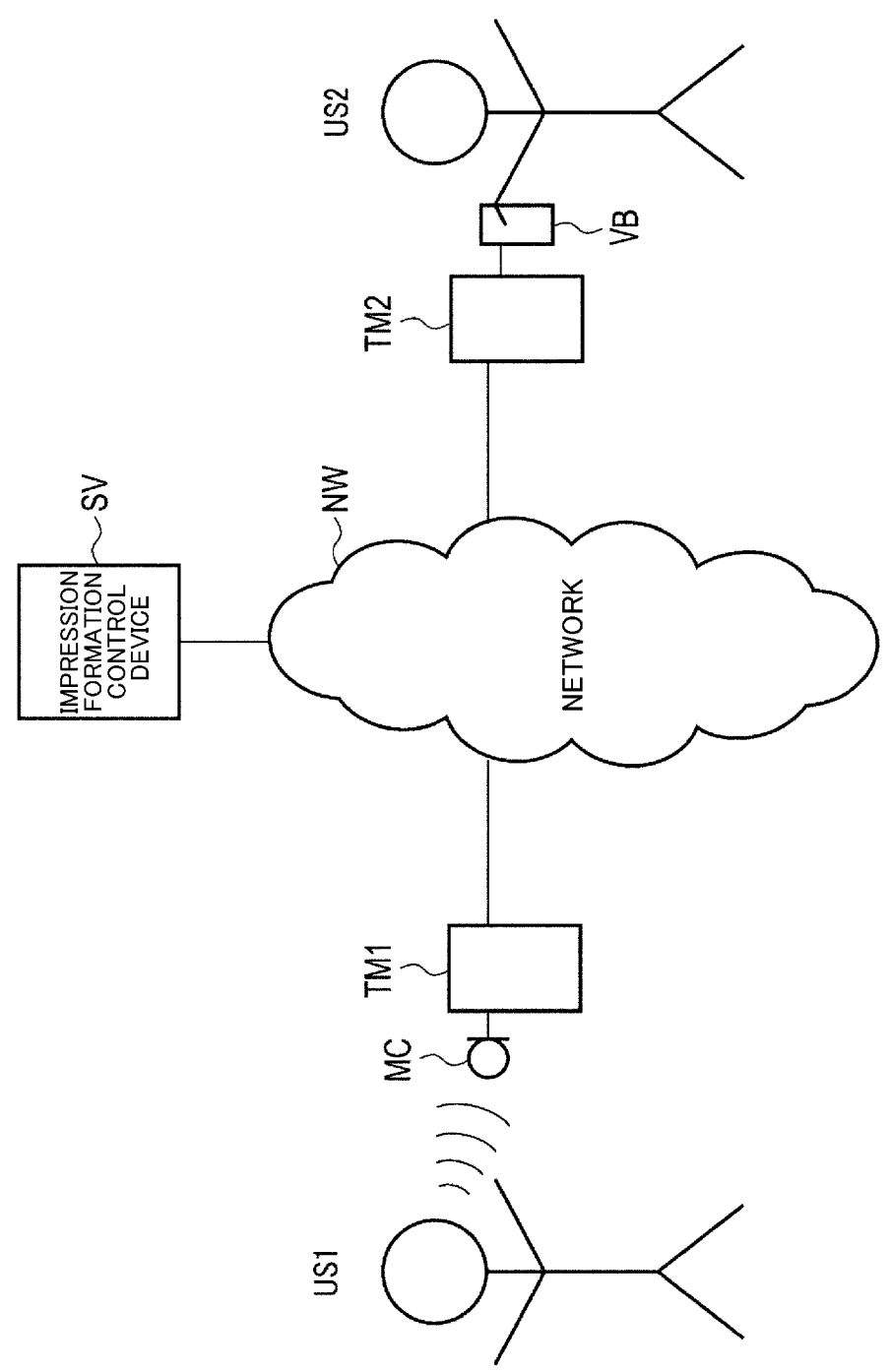
FIG. 1 is a diagram illustrating an example of a configuration of a system including an impression formation control device according to an embodiment of the present invention.

FIG. 1 is a diagram illustrating an example of a configuration of a system including an impression formation control device SV according to an embodiment of the present invention.

In the system according to the embodiment, for example, a lecturer (hereinafter referred to as a speaker) US1 in a lecture or seminar uses a lecture terminal TM1 including a microphone MC to transmit a speech voice signal to a participation terminal TM2 used by a participant (hereinafter referred to as a listener) US2 via the network NW and the impression formation control device SV. The network NW includes a wide area network having a public IP network such as the Internet.

Each of the lecture terminal TM1 and the participation terminal TM2 is configured with, for example, a personal computer. For example, the terminals TM1 and TM2 are connected to the network NW via an access network such as a local area network (LAN).

The terminals TM1 and TM2 may be portable terminals such as a smartphone or a tablet terminal, and a wireless LAN or a public mobile communication network may be used as the access network. The microphone MC may be an external type or built-in type microphone externally attached to the terminal TM1.

(2) Device (2-1) Impression Formation Control Device SV

Figure 2:
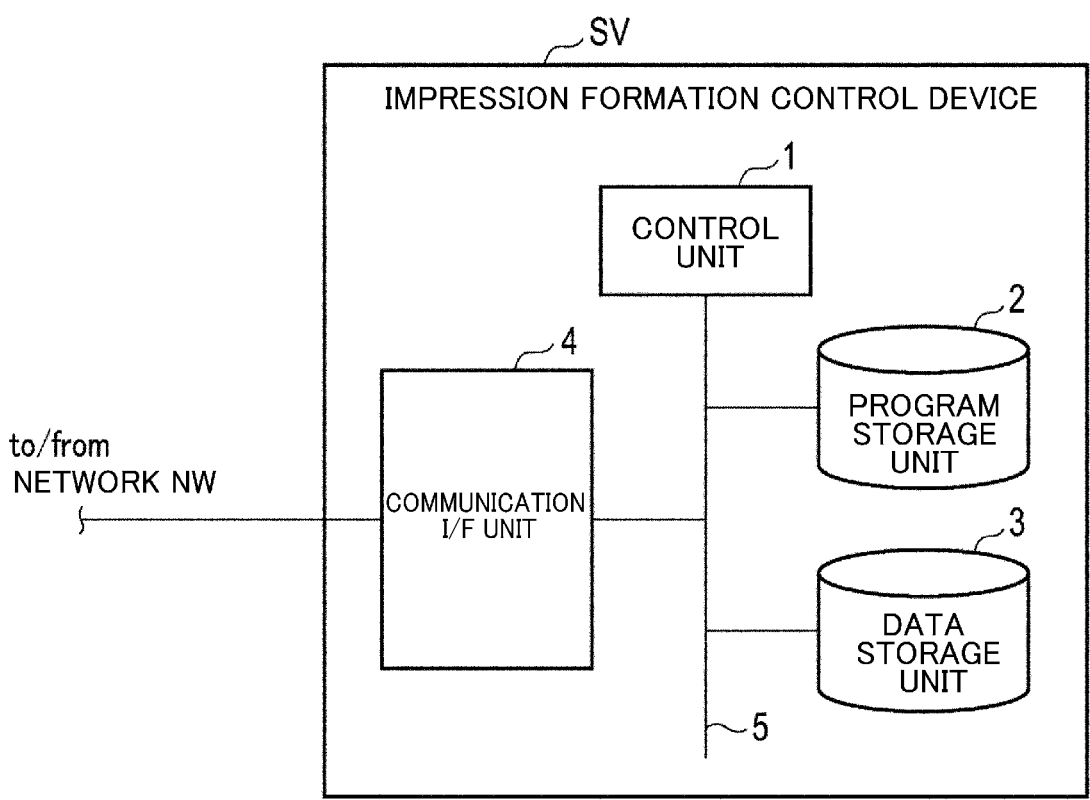
FIG. 2 is a block diagram illustrating an example of a hardware configuration of the impression formation control device according to the embodiment of the present invention.
Figure 3:
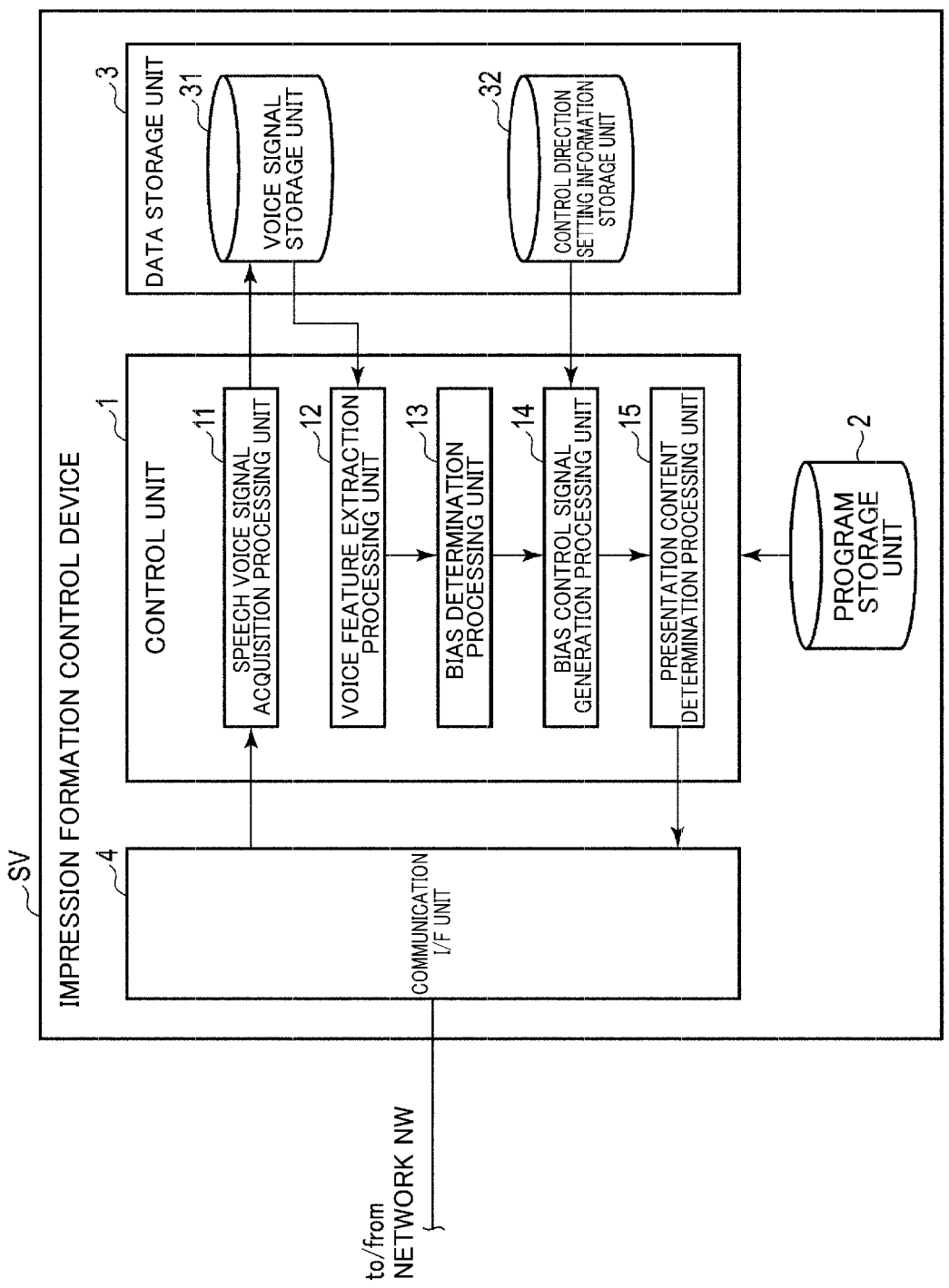
FIG. 3 is a block diagram illustrating an example of a software configuration of the impression formation control device according to the embodiment of the present invention.

FIGS. 2 and 3 are block diagrams illustrating examples of a hardware configuration and a software configuration of the impression formation control device SV, respectively.

The impression formation control device SV is configured with, for example, a server computer disposed on a web or cloud, and includes a control unit 1 using a hardware processor such as a central processing unit (CPU). In the impression formation control device SV, a storage unit including a program storage unit 2 and a data storage unit 3 is connected to a communication interface (hereinafter abbreviated as an I/F) unit 4 and the control unit 1 via a a bus 5.

The communication I/F unit 4 transmits and receives voice data to and from the lecture terminal TM1 and the participation terminal TM2 in conformity with a communication protocol defined by the network NW under the control of the control unit 1.

The program storage unit 2 serves as, for example, a storage medium and is configured by a combination of a nonvolatile memory such as a hard disk drive (HDD) or a solid state drive (SSD) in which writing and reading can be performed at any time, and a nonvolatile memory such as a read only memory (ROM), and stores application programs necessary to perform various types of control processing according to the embodiment of this invention in addition to middleware such as an operating system (OS).

The data storage unit 3 includes a voice signal storage unit 31 and a control direction setting information storage unit 32 as storage regions according to the embodiment, for example, by combining a nonvolatile memory such as an HDD or an SSD serving as a storage medium and capable of performing writing and reading at any time and a volatile memory such as a random access memory (RAM).

The voice signal storage unit 31 temporarily stores a speech voice signal of the speaker transmitted from the lecture terminal TM1 for impression formation control processing.

The control direction setting information storage unit 32 stores information for setting a bias control direction when impression formation is controlled. The bias represents a physical amount of an impression felt by the listener US2 of a participation side with respect to the speaker US1 performing a lecture, and the setting information of the control direction is information for defining the control direction of the bias.

As processing functions according to the embodiment of the present invention, the control unit 1 includes a speech voice signal acquisition processing unit 11, a voice feature extraction processing unit 12, a bias determination processing unit 13, a bias control signal generation processing unit 14, and a presentation content determination processing unit 15. These processing units 11 to 15 are implemented by causing a hardware processor of the control unit 1 to execute an application program stored in the program storage unit 2.

Some or all of the processing units 11 to 15 may also be implemented using hardware such as a large scale integration (LSI) or an application specific integrated circuit (ASIC).

The speech voice signal acquisition processing unit 11 receives a speech voice signal of the speaker US1 transmitted from the lecture terminal TM1 via a communication I/F unit 4, and temporarily stores the received speech voice signal in the voice signal storage unit 31.

The voice feature extraction processing unit 12 reads the speech voice signal from the voice signal storage unit 31 as an input, extracts a voice feature from the read speech voice signal and outputs the voice feature. As the voice feature, at least one of a fundamental frequency, a speech speed, and intonation is extracted.

The bias determination processing unit 13 receives the voice feature of the speech voice signal extracted by the voice feature extraction processing unit 12 as an input, determines a bias estimated to be generated in the listener US2 based on the voice feature of the speech voice signal, and outputs a determination result of the bias. An example of the determination processing will be described in more detail in the operation example.

The bias control signal generation processing unit 14 receives the determination result of the bias from the bias determination processing unit 13 as an input, and reads the setting information of the control direction from the control direction setting information storage unit 32 as an input. Then, the bias control signal generation processing unit 14 generates and outputs a bias control signal for controlling the bias generated in the listener US2 based on the determination result of the bias and the setting information of the control direction.

The presentation content determination processing unit 15 receives the bias control signal generated by the bias control signal generation processing unit 14 as an input, and determines the content of physical external stimulation to be given to the listener US2 based on the bias control signal. As the physical external stimulation, for example, tactile stimulation in which temperature or hardness changes is used. An example of the bias control signal generation processing will be described in more detail in the operation example. The presentation content determination processing unit 15 generates a stimulation control signal corresponding to the content of the external stimulation, and transmits the generated stimulation control signal from the communication I/F unit 4 to the terminal TM2 of the listener US2.

(2-2) Terminal TM2 on Participation Side

A presentation device VB for giving physical external stimulation to the listener US2 is connected to the terminal TM2 on the participation side. As the presentation device VB, for example, a mouse in which a Peltier element is incorporated and with which temperature can be presented, an elastic body with which hardness can be presented by expansion and contraction, or the like is used. The participation terminal TM2 receives the received stimulation control signal as an input, and drives the presentation device VB in accordance with the stimulation control signal to change the temperature or the hardness, for example. By changing the temperature or the hardness, it is possible to expect the effect of changing the bias generated in the listener US2.

The physical external stimulation given to the listener US2 is not only tactile stimulation such as a change in temperature or hardness but also tactile stimulation to which wind pressure or vibration is applied, visual stimulation such as the presence or absence of light emission or a change in a light emission color, olfactory stimulation such as presence or absence or change of aroma may be used. The physical external stimulation can be given to the listener US2 by using an electric fan, a vibrator, a display, an aroma diffuser, or the like as presentation devices VB.

Operation Example

Next, an operation example of the impression formation control device SV that has the foregoing configuration will be described.

Figure 4:
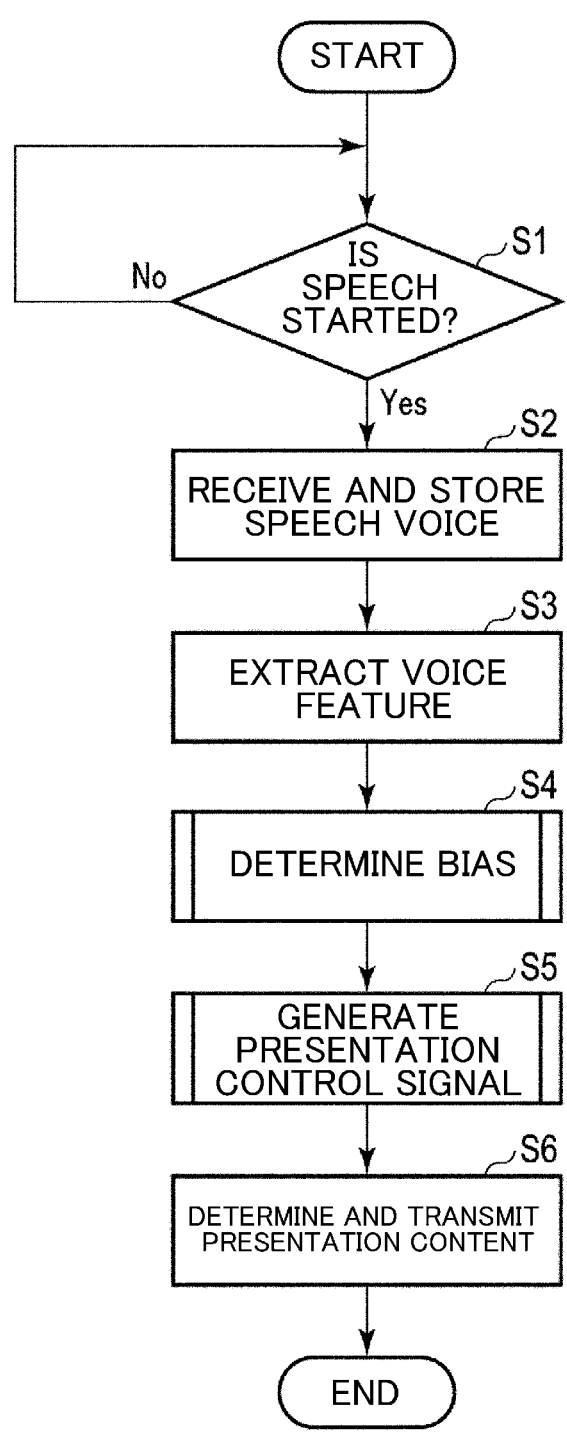
FIG. 4 is a flowchart illustrating an example of a processing procedure and processing content of impression formation control processing executed by a control unit of the impression formation control device illustrated in FIG. 3.

FIG. 4 is a flowchart illustrating an example of a processing procedure and processing content of impression formation control processing performed by the control unit 1 of the impression formation control device SV.

(1) Setting of Control Direction

Before start of the impression formation control, the control unit 1 of the impression formation control device SV performs setting processing of a control direction in accordance with, for example, an input of a system manager. As the control direction, a control direction of a bias presented to a listener who is a participant is set and, for example, three types of control direction of "positive," "negative," and "suppression" are set. The control unit 1 of the impression formation control device SV stores information indicating the set control direction in the control direction setting information storage unit 32.

Examples of the bias include reliability, intimacy, and favorability. The positive direction of the bias indicates, for example, a direction in which the reliability is deepened in the case of the reliability, a direction in which the intimacy is deepened in the case of the intimacy, a direction in which the favorability is increased in the case of the favorability. A direction in which the bias is negative is the reverse direction. The direction in which the bias is suppressed indicates that the bias itself is not changed. In the following description, as the bias, reliability, intimacy, and favorability will be described as examples, but these biases are merely exemplary. The bias may be any bias as long as it is affected by physical external stimulation, and the present invention is not limited to reliability, intimacy, and favorability.

The control direction may be set by a speaker who is a lecturer or may be set by a listener who is a participant.

(2) Acquisition of Speech Voice Signal

When the listener US2 participates in a lecture or a seminar, the listener US2 who is a participant accesses a uniform resource locator (URL) of a site notified in advance by, for example, a sponsor. Then, for example, a line via the impression formation control device SV is set between the lecture terminal TM1 and the participation terminal TM2.

In this state, the control unit 1 of the impression formation control device SV determines start of a speech of the speaker US1 who is a lecturer based on a speech voice signal transmitted from the lecture terminal TM1 in step S1. Then, when the speech is started, the control unit 1 of the impression formation control device SV subsequently receives the speech voice signal of the speaker US1 transmitted from the lecture terminal TM1 through the communication I/F unit 4 under the control of the speech voice signal acquisition processing unit 11 in step S2, temporarily stores the received speech voice signal in the voice signal storage unit 31.

A timing at which the speech voice signal is acquired may be set to any timing, and an acquisition time length may be set to any length as long as the acquisition time length is long enough to extract the voice feature. For example, the timing of the speech voice signal is acquired may be a predetermined time determined based on a time required for the speaker to change or the listener to form an impression of the speaker, the acquisition time length of the speech voice signal may be a time determined based on a time required for the listener to estimate the impression of the speaker, for example, it is preferable to set the time to about 10 seconds.

Further, the number of times the speech voice signal is acquired may be 1, but may be set so that the speech voice signal can be acquired a plurality of times by a predetermined length during a lecture. When the speech voice signal is acquired periodically a plurality of times, a bias to be presented to the listener US2 can be controlled again in accordance with the change in the impression although the voice feature of the speech voice signal of the speaker US1 changes during a lecture and an impression generated in the listener changes.

(3) Extraction of Voice Feature

When the speech voice signal is acquired, the control unit 1 of the impression formation control device SV reads the speech voice signal from the voice signal storage unit 31 under the control of the voice feature extraction processing unit 12 in step S3, and extracts a voice feature from the read speech voice signal. As the voice feature, at least one of a fundamental frequency, a speech speed, and intonation is extracted.

Although a well-known scheme described in the following Reference Literature 1 can be used as a scheme for extracting a voice feature, the present invention is not limited to the scheme described in Reference Literature 1.

Reference Literature 1: F. Eyben, M. Wo¨ llmer, and B. Schuller, "OpenSMILE—The Munich versatile and fast open-source audio feature extractor," MM' 10-Proc. ACM Multimed. 2010 Int. Conf., pp. 1459 to 1462, 2010.

(4) Determination of Bias

The control unit 1 of the impression formation control device SV subsequently determines a bias estimated to be generated in the listener US2 by the speech voice signal of the speaker US1 based on the voice feature under the control of the bias determination processing unit 13 in step S4.

As the bias determination scheme, the following scheme is used in accordance with a type of voice feature.

(4-1) Case of Fundamental Frequency

Figure 5:
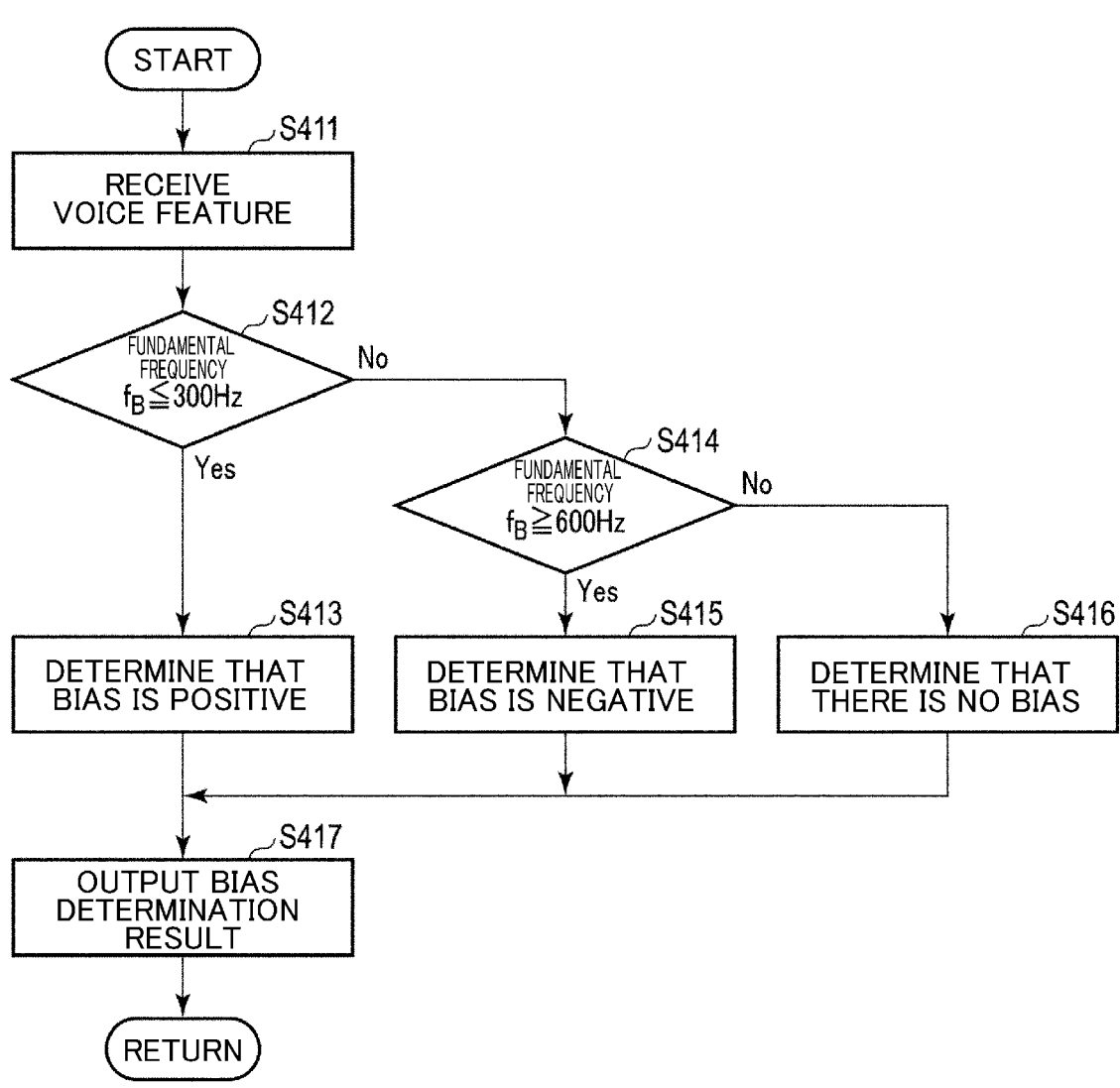
FIG. 5 is a flowchart illustrating an example of a processing procedure and processing content of a first example of bias determination processing in the processing procedure illustrated in FIG. 4.

FIG. 5 is a flowchart illustrating an example of a processing procedure and processing content of the bias determination processing performed by the bias determination processing unit 13 when the voice feature is a "fundamental frequency."

The bias determination processing unit 13 first receives a "fundamental frequency" extracted as a voice feature from the voice feature extraction processing unit 12 in step S411, and determines a bias estimated to be generated in the listener US2 based on a level of the fundamental frequency.

Here, a relation between the level of the fundamental frequency and the bias has a tendency that it is known that evaluation of low voice for "reliability", "intimacy", and "favorability" is high and evaluation of a high voice is conversely low, as exemplified in NPL 1.

Accordingly, the bias determination processing unit 13 determines in step S412 whether the fundamental frequency $f_B$ is, for example, 300 Hz or less, and determines in step S414 whether the fundamental frequency f is, for example, 600 Hz or more.

When the fundamental frequency $f_B$ is 300 Hz or less as a result of the determination, the bias determination processing unit 13 determines in step S413 that the bias estimated to be generated in the listener US2 is "positive". Conversely, when the fundamental frequency $f_B$ is 600 Hz or more, the bias determination processing unit 13 determines in step S415 that the bias estimated to be generated in the listener US2 is "negative." When the fundamental frequency $f_B$ is 300 Hz or more and less than 600 Hz, the bias determination processing unit 13 determines in step S416 that the bias is not generated in the listener US2, that is, the bias is "no."

The evaluation of "reliability," "intimacy," and "favorability" is different depending on the relationship between the speaker US1 and the listener US2. Therefore, a threshold for determining the level of the fundamental frequency $f_B$ is preferably set to any value without being limited to 300 Hz and 600 Hz described above.

In step S417, the bias determination processing unit 13 finally outputs the determination result obtained in step S413, S415 or S416 to the bias control signal generation processing unit 14.

(4-2) Case of Speech Speed

Figure 6:
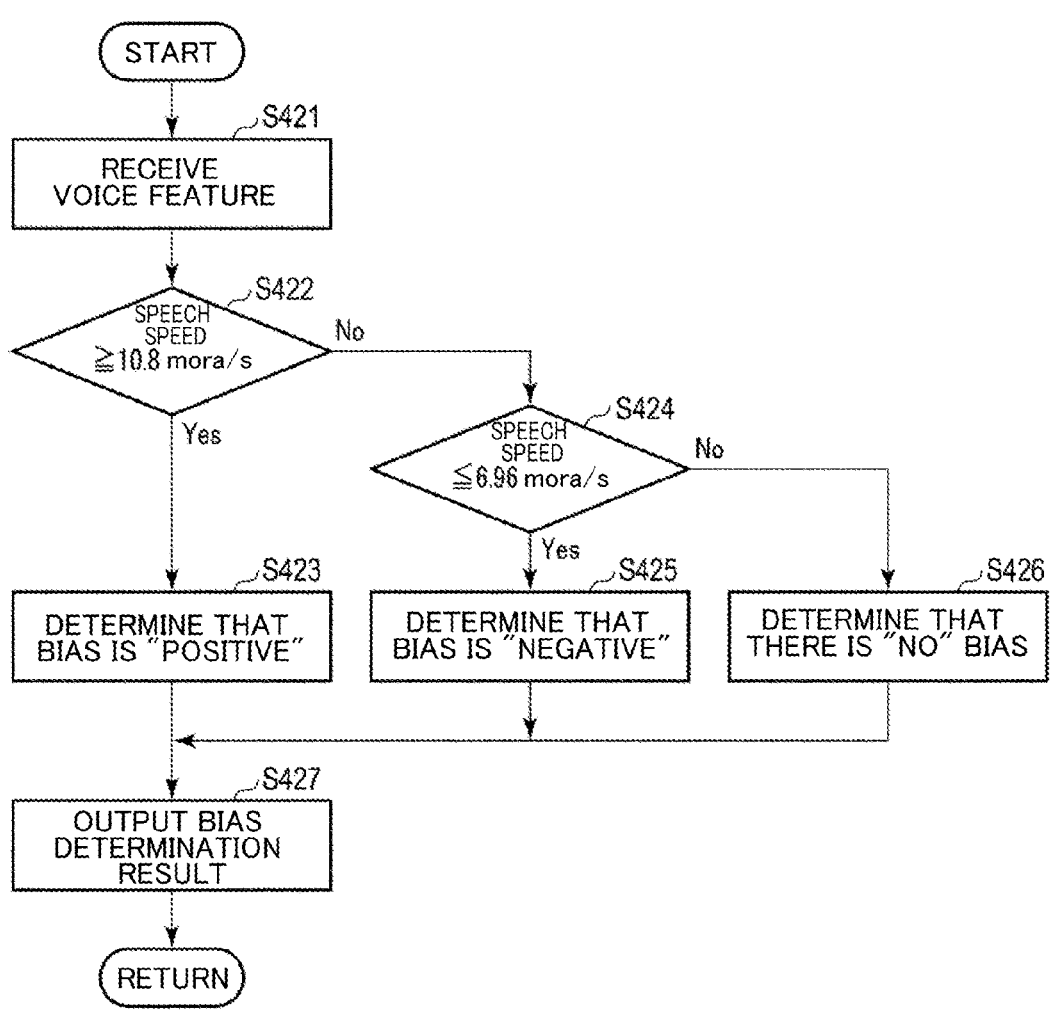
FIG. 6 is a flowchart illustrating an example of a processing procedure and processing content of a second example of bias determination processing in the processing procedure illustrated in FIG. 4.

FIG. 6 is a flowchart illustrating an example of a processing procedure and processing content of bias determination processing performed by the bias determination processing unit 13 when the voice feature is a "speech speed."

The bias determination processing unit 13 first receives the "speech speed" extracted as the voice feature from the voice feature extraction processing unit 12 in step S421, and determines a bias estimated to be generated in the listener US2 based on whether the speech speed is fast or slow. It is well known that there is a relationship between the bias and whether the speech speed is fast or slow. For example, the knowledge that "diplomatic" evaluation tends to become high when the speech speed is relatively high, and conversely the "diplomatic" evaluation tends to become low when the speech speed is low is described in the following Reference Literature 2.

[Reference Literature 2] Teruhisa Uchida, "Effects of the speech rate on speakers' personality-trait impressions," Psychological Study, vol. 73, No. 2, pp. 131 to 139.2002.

Here, when the bias is "reliability", "intimacy", and "favorability", for example, the speech speed is relatively fast, evaluation for "reliability", "intimacy", and "favorability" is high. Conversely, when the speech speed is slow, the evaluation for "reliability", "intimacy", and "favorability" is low.

Accordingly, the bias determination processing unit 13 determines in step S422 whether the speech speed is, for example, 10.8 mora/sec or more, and determines in step S424 whether the speech speed is, for example, 6.96 mora/sec or less. The mora is a unit that represents the number of "kana," "long vowels," "geminate consonants," and "nasal sounds" in the Japanese syllabary.

As a result of the determination, when the speech speed is 10.8 mora/sec or more, the bias determination processing unit 13 determines in step S423 that the bias estimated to be generated in the listener US2 is "positive." Conversely, when the speech speed is 6.96 mora/sec or less, the bias determination processing unit 13 determines in step S425 that the bias estimated to be generated in the listener US2 is "negative." When the speech speed is greater than 6.96 mora/sec and less than 10.8 mora/sec, the bias determination processing unit 13 determines in step S426 that there is no bias.

Even in this case, "reliability", "intimacy", and "favorability" are different depending on the relationship between the speaker US1 and the listener US2. Therefore, the threshold for determining the speech speed is not limited to 10.8 mora/sec and 6.96 mora/sec described above and is preferably set to any value.

In step S427, the bias determination processing unit 13 finally outputs the determination result obtained in step S423, S425 or S426 to the bias control signal generation (4-3) Case of Intonation In general, it is well known that there is a relationship between the magnitude of intonation of the speech and the bias. For example, the knowledge that the "diplomatic" evaluation tends to become high when the intonation is high, and conversely the "diplomatic" evaluation tends to become low when the intonation is low is described in the following Reference Literature 3.

[Reference Literature 3] Teruhisa Uchida, "Effects of intonation contours in speech upon the image of speakers' personality," Psychological Study," vol. 76, No. 4, pp. 382 to 390.2005.

When the bias is "reliability", "intimacy", and "favorability", for example, the intonation is high, evaluation for "reliability", "intimacy", and "favorability" is high. Conversely, when the intonation is low, the evaluation for "reliability", "intimacy", and "favorability" is low.

Accordingly, the bias determination processing unit 13 determines whether a standard deviation of the fundamental frequency representing "intonation" is, for example, 40 Hz or more and determines whether the standard deviation of the fundamental frequency is, for example, 20 Hz or less, similarly to the determination processing procedure of the fundamental frequency illustrated in FIG. 5. When the standard deviation of the fundamental frequency is, for example, 40 Hz or more as a result of the determination, the bias determination processing unit 13 determines that the bias estimated to be generated in the listener US2 is "positive." Conversely, when the standard deviation of the fundamental frequency is, for example, 20 Hz or less, the bias determination processing unit 13 determines that the bias estimated to be generated in the listener US2 is "negative." When the standard deviation of the fundamental frequency is greater than 20 Hz and less than 40 Hz, the bias determination processing unit 13 determines that the bias is "no" for the listener.

Also in this case, since the evaluations of "reliability," "intimacy," and "favorability" are different depending on the relationship between the speaker US1 and the listener US2, a threshold for determining the standard deviation of the fundamental frequency is not limited to 40 Hz and 20 Hz, but any threshold may be set.

The bias determination processing unit 13 finally outputs the determination result to the bias control signal generation (5) Generation of Bias Control Signal In step S5, the control unit 1 of the impression formation control device SV subsequently performs processing for generating a bias control signal for presenting physical external stimulation to the listener US2 under the control of the bias control signal generation processing unit 14 as follows.

Figure 7:
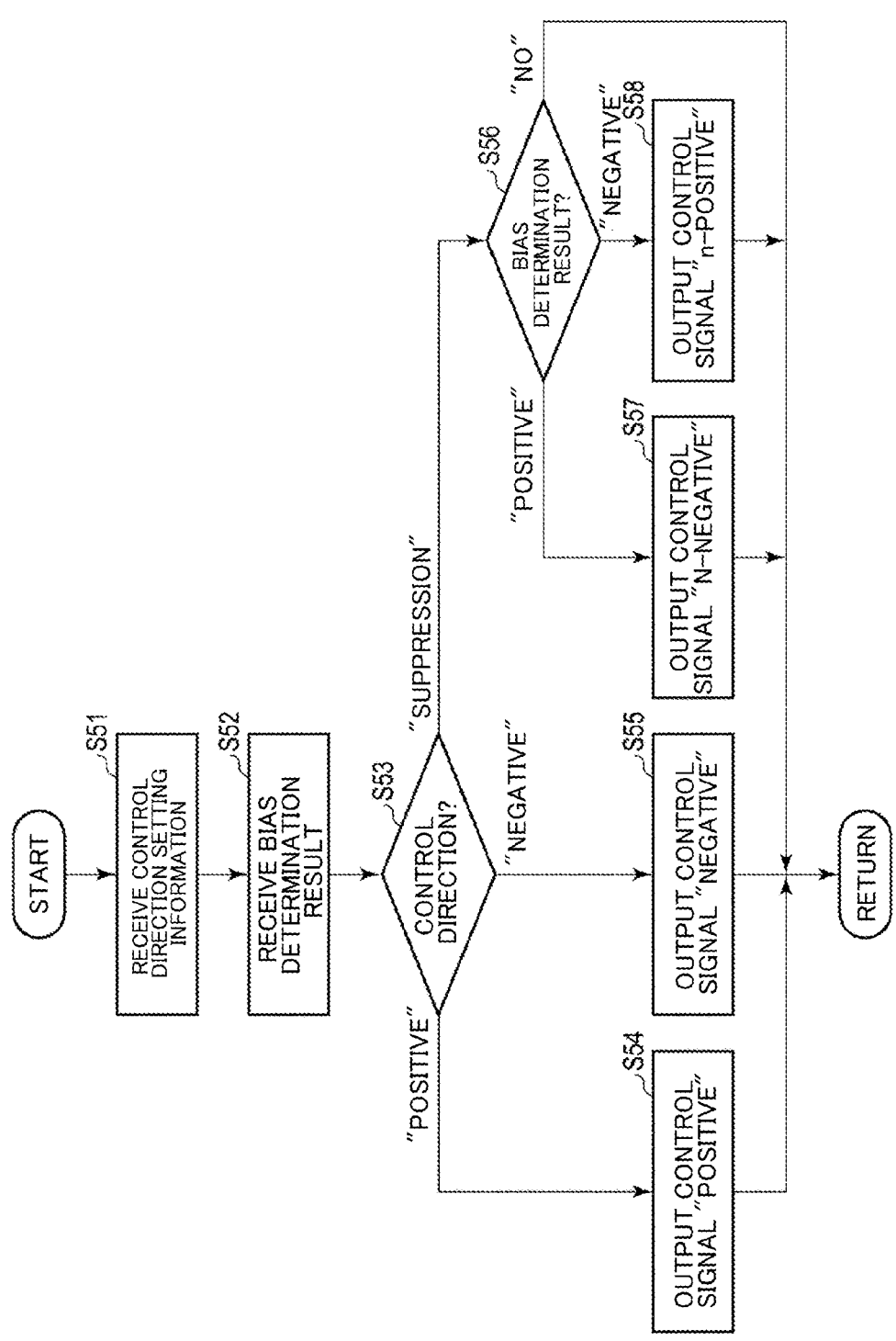
FIG. 7 is a flowchart illustrating an example of a processing procedure and processing content of bias control signal generation processing in the processing procedure illustrated in FIG. 4.

FIG. 7 is a flowchart illustrating an example of a processing procedure and processing content of the bias control signal generation processing performed by the bias control signal generation processing unit 14.

The bias control signal generation processing unit 14 first reads the setting information of the control direction from the control direction setting information storage unit 32 in step S51 and receives the determination result of the bias from the bias determination processing unit 13 in step S52.

The bias control signal generation processing unit 14 determines whether the setting information of the control direction read in step S53 is "positive," "negative," "suppression." When the result of the determination is "positive," a bias control signal "positive" for generating the "positive" bias for the listener US2 is generated in step S54.

The bias control signal "positive" has a function of generating an external stimulation for further increasing the "positive" bias when the determination result of the bias determined from the voice feature is "positive." Accordingly, the effect of amplifying the "positive" bias generated in the listener US2 can be expected. The bias control signal "positive" has a function of generating an external stimulation for canceling the "negative" bias when the determination result of the bias determined from the voice feature is "negative." Accordingly, the effect of generating the "positive" bias for the listener US2 can be expected. Further, the bias control signal "positive" has a function of generating external stimulation for generating the "positive" bias for the listener US2 when the determination result of the bias determined from the voice feature is "no."

Conversely, it is assumed that, as the determination result of the control direction in step S53, the control direction is "negative" In this case, the bias control signal generation processing unit 14 generates a bias control signal "negative" for generating a "negative" bias for the listener US2 in step S55.

The bias control signal "negative" has a function of generating external stimulation for canceling the "positive" bias when the determination result of the bias determined from the voice feature is "positive." Accordingly, the effect of generating the "negative" bias for the listener US2 can be expected. The bias control signal "negative" has a function of generating external stimulation for further increasing the "negative" bias when the determination result of the bias determined from the voice feature is "negative." Accordingly, the effect of amplifying the "negative" bias for the listener US2 can be expected. Further, the bias control signal "negative" has a function of generating external stimulation for generating the "negative" bias for the listener US2 when the determination result of the bias determined from the voice feature is "no."

Finally, it is determined that the control direction is "suppressed" as a result of the determination of the control direction in the foregoing step S53. In this case, in step S56, the bias control signal generation processing unit 14 determines that the determination result of the bias determined from the voice feature is one of "positive," "negative," and "no."

As a result of the determination, it is determined that the bias determined from the voice feature is "positive." In this case, in step S57, the bias control signal generation processing unit 14 generates a bias control signal "n-negative" for canceling a "positive" bias for the listener US2. The bias control signal "n-negative" is a signal for generating external stimulation for changing the bias of the listener US2 in the "no" direction.

Conversely, it is determined that the bias determined from the voice feature is "negative" as a result of the determination in the foregoing step S56. In this case, the bias control signal generation processing unit 14 generates a bias control signal "n-positive" for changing the "negative" bias determined from the voice feature in the "positive" direction in step S58. The bias control signal "n-positive" is a signal for generating external stimulation so that a bias in the "positive" direction for the listener US2 is given. By generating external stimulation so that the bias in the "positive" direction to the listener US2 is given, an effect of changing the bias of the listener US2 in the "no" direction can be expected.

It is also determined that the bias determined from the voice feature is "no" as a result of the determination in the foregoing step S56. In this case, the bias control signal generation processing unit 14 ends the bias control signal generation processing without generating the bias control signal.

(6) Determination of Presentation Content and Transmission of Stimulation Control Signal Finally, in step S6, the control unit 1 of the impression formation control device SV performs processing for determining content of external stimulation to be presented to the listener US2 and transmitting the stimulation control signal under the control of the presentation content determination processing unit 15 as follows.

That is, the presentation content determination processing unit 15 receives the bias control signal from the bias control signal generation processing unit 14 and determines the content of the external stimulation to be given to the listener US2 based on the received bias control signal. Then, the stimulation control signal for operating the presentation device VB is generated in accordance with the determined content of the external stimulation.

(6-1) Case where "Temperature" is Used as External Stimulation

In general, a person tends to feel "close" for a relation between an acquaintance and an experimenter when the person holds a warm object in her or his hand or when the room is warm, compared with when the person holding a cold object or when the room is cold. This knowledge is reported in, for example, Reference Literature 4.

[Reference Literature 4] H. Ijzerman and G. R. Semin, "The thermometer of social relations: Mapping social proximity on temperature: Research article," Psychol. Sci., vol. 20, No. 10, pp. 1214 to 1220, 2009.

Accordingly, for example, as the presentation device VB, a mouse in which a Peltier element capable of presenting temperature is built is used. In this case, the presentation content determination processing unit 15 determines the presentation content of the external stimulation as follows.

(1) When the bias control signal is "positive," the presentation content is set to "40 degrees" which is a temperature at which a person generally feels warm.

(2) When the bias control signal is "n-positive," the presentation content is set to "35 degrees" which is a temperature lower than in the case of "positive" and a temperature at which a person feels warm.

(3) When the bias control signal is "n-negative," the presentation content is set to "30 degrees" which is a temperature lower than in the case of "n-positive" and a temperature at which a person feels cold.

(4) When the bias control signal is "negative," the presentation content is set to "25 degrees" which is a temperature lower than "n-negative" and a temperature at which a person feels cold.

The presentation content of the temperature is not limited to the foregoing example, but any content may be set in accordance with an individual difference of a thermal sense of the listener US2.

The presentation content determination processing unit 15 generates a stimulation control signal for causing the presentation device VB to generate the temperature of the determined presentation content. Then, the presentation content determination processing unit 15 transmits the generated stimulation control signal from the communication I/F unit 4 to the participation terminal TM2 used by the listener.

When the stimulation control signal is received, the participation terminal TM2 drives the presentation device VB in accordance with the received stimulation control signal, and generates a temperature designated with the stimulation control signal. Accordingly, when the listener US2 holds a mouse serving as the presentation device VB at this time, external stimulation by the "temperature" can be given to the listener US2, and the effect of controlling an impression of the listener US2 with respect to the speaker US1 who is a lecturer can be expected.

(6-2) Case where "Hardness" is Used for External Stimulation

In general, when a person touches a hard object, the person tends to evaluate his or her partner as being strict or non-emotional compared to a case where the person touches a soft object. This knowledge is reported in, for example, the following Reference Literature 5.

[Reference Literature 5] J. M. Ackerman, C. C. Nocera, and J. A. Bargh, "Incidental Haptic Sensations Influence Social Judgments and Decisions," Science (80-.)., vol. 328, No. 5986, pp. 1712-1715 Jun. 2010.

Accordingly, for example, a balloon of which hardness is changed by applying a pressure is used as the presentation device VB. A device presenting the hardness using the balloon is disclosed in, for example, the following Reference Literature 6. Instead of the balloon, for example, an elastic body capable of presenting hardness by expansion and contraction can also be used.

[Reference Literature 6] Mana Sasagawa, et al. "A Food Texture Display with Hardness and Shape by Jamming," vol. 60, No. 2, pp. 376 to 384.2019.

When the balloon is used as the presentation device VB, the presentation content determination processing unit 15 determines the presentation content of the external stimulation as follows.

(1) When the bias control signal is "positive," the presentation content is set to "−10 kPa" which is hardness for which a person generally feels soft.

(2) When the bias control signal is "n-positive," the presentation content is set to "−30 kPa" which is a hardness lower than that in the case of "positive" and hardness for which a person feel hard.

(3) When the bias control signal is "n-negative," the presentation content is set to "−50 kPa" which is hardness lower than that in the case of "n-positive" and hardness for which a person feel hard.

(4) When the bias control signal is "negative," the presentation content is set to "−70 kPa" which is hardness lower than "n-negative" and hardness for which a person feel hard.

The presentation content of the hardness is not limited to the foregoing example. For example, any content may be set in accordance with an individual difference in how hard the listener US2 feels.

The presentation content determination processing unit 15 generates a stimulation control signal for causing the presentation device VB to generate hardness of the determined presentation content. Then, the presentation content determination processing unit 15 transmits the generated stimulation control signal from the communication I/F unit 4 to the participation terminal TM2 used by the listener.

When the stimulation control signal is received, the participation terminal TM2 drives the presentation device VB in accordance with the received stimulation control signal to generate hardness designated by the stimulation control signal. Accordingly, when the listener US2 holds the balloon as the presentation device VB at this time, external stimulation by the "hardness" can be given to the listener US2, and thus the effect of controlling an impression of the listener US2 with respect to the speaker US1 who is the lecturer can be expected.

Action and Effects

As described above, in the embodiment, in the impression formation control device SV, the speech voice signal of the speaker US1 who is the lecturer is first acquired, the voice feature is extracted, and the bias estimated to be generated in the listener US2 who is the participant is determined based on the extracted voice feature. Subsequently, the bias control signal for presenting physical external stimulation to the listener US2 is generated based on the determination result of the bias and information indicating a control direction of the bias set in advance, the content of the external stimulation to be given to the listener US2 is determined based on the generated bias control signal, and the stimulation control signal corresponding to the content of the external stimulation is transmitted to the terminal TM2 of the listener US2. The presentation device VB is driven by the stimulation control signal to apply physical external stimulation to the listener US2 as a bias, and thus the impression of the listener US2 with respect to the speaker US1 is changed.

Accordingly, for example, even when the listener PS2 who is a participant generates a negative impression to the speaker PS1 who is a lecturer by the speech voice signal, the negative impression generated in the listener PS2 can be canceled or alleviated by applying a bias to the listener PS2 by external stimulation using temperature and hardness. Since the voice feature of the speech voice signal emitted from the speaker PS1 is not altered, an intention of the speaker PS1 can be accurately transmitted to the listener PS2.

Other Embodiments (1) In the foregoing embodiment, the case where the listener PS2 who is a participant takes a lecture of the speaker PS1 who is a lecturer via a network has been described as an example. However, the present invention is not limited thereto. The present invention is also applicable even when the listener PS2 takes a lecture of the speaker PS1 in a face-to-face manner. Even in this case, a similar configuration can also be implemented as in the embodiment.

For example, the speech voice signal of the speaker SP1 is transmitted from the lecture terminal TM1 to the impression formation control device SV. Then, the impression formation control device SV determines a bias estimated to be generated in the listener PS2 from the voice feature of the speech voice signal, generates a control signal for controlling the bias of the listener PS2 based on the determination result, and transmits the control signal for controlling the bias of the listener PS2 to the participation terminal TM2 based on the determination result. The terminal TM2 drives the presentation device VB in accordance with the control signal to give external stimulation to the listener PS2, and thus the effect of controlling the bias generated in the listener PS2 can be expected.

(2) In the foregoing embodiment, the case where a server computer disposed on a cloud or a web has the processing function of the impression formation control device SV has been described as an example. However, the present invention is not limited thereto. For example, the lecture terminal TM1 or the participation terminal TM2 may have the processing function of the impression formation control device SV. The processing function of the impression formation control device SV may be distributed and disposed in the lecture terminal TM1, the participation terminal TM2, and a server computer disposed on a cloud or a web.

(3) In addition, the configuration of the impression formation control device SV, the processing procedure and the processing content, the generation timing of the external stimulation, the type of external stimulation, the presentation means of the external stimulation, and a use scene of the impression formation control device SV can be modified and implemented in various ways within the scope of the present invention without deviating from the gist of the present invention.

Although the embodiments of the present invention have been described in detail above, the above description is merely illustrative of the present invention in every aspect. It goes without saying that various modifications and variations can be made without departing from the scope of the invention. That is, a specific configuration according to an embodiment may be appropriately adopted in implementation of the present invention.

This invention is not limited to the embodiments as they are, but can be embodied by modifying constituent elements in the implementation stage without departing from the gist of the present invention. Various inventions can be made by appropriate combinations of the plurality of constituent elements disclosed in the above embodiments. For example, some of all the constituent elements described in the embodiments may be omitted. Furthermore, constituent elements of different embodiments may be combined as appropriate.

REFERENCE SIGNS LIST

SV Impression formation control device
US1 Speaker
US2 Listener
TM1 Lecture terminal
TM2 Participation terminal
NW Network
MC Microphone
VB Presentation device
1 Control unit
2 Program storage unit
3 Data storage unit
4 Communication I/F unit
5 Bus
11 Speech voice signal acquisition processing unit
12 Voice feature extraction processing unit
13 Bias determination processing unit
14 Bias control signal generation processing unit
15 Presentation content determination processing unit
31 Voice signal storage unit
32 Control direction setting information storage unit

The invention claimed is:

1. An impression formation control device controlling impression formation for a listener with respect to a speaker, the impression formation control device comprising:

a first processing unit configured to acquire a speech voice signal of the speaker;

a second processing unit configured to extract a voice feature from the speech voice signal;

a third processing unit configured to determine a bias to an impression made on the listener by the speech voice signal based on the voice feature;

a fourth processing unit configured to generate a bias control signal for controlling the bias based on a determination result of the bias and information indicating a preset control direction of the bias; and a fifth processing unit configured to generate a stimulation control signal for giving external stimulation to the listener in accordance with the bias control signal, and output the generated stimulation control signal.

2. The impression formation control device according to claim 1, wherein the second processing unit is configured to extract at least one of a fundamental frequency, a voice speed, and an intonation from the speech voice signal as a voice feature, and wherein the third processing unit is configured to compare the extracted voice feature with a preset determination condition and determine the bias generated in the listener based on a comparison result.

3. The impression formation control device according to claim 1, wherein, when the external stimulation is a temperature, the fourth processing unit is configured to generate the bias control signal for designating a control direction and a control amount of the temperature based on the determination result of the bias and information indicating the preset control direction of the bias, and wherein the fifth processing unit is configured to generate the stimulation control signal for giving the external stimulation to the listener by a change in the temperature in accordance with the bias control signal and output the generated stimulation control signal.

4. The impression formation control device according to claim 1, wherein, when the external stimulation is hardness, the fourth processing unit is configured to generate the bias control signal for designating a control direction and a control amount of the hardness based on a determination result of the bias and information indicating the preset control direction of the bias, wherein the fifth processing unit is configured to generate the stimulation control signal for giving the external stimulation to the listener by the change in the hardness in accordance with the bias control signal and output the generated stimulation control signal.

5. An impression formation control method of controlling impression formation for a listener with respect to a speaker, the impression formation control method being executed by an information processing device, the method comprising:

acquiring a speech voice signal of the speaker;

extracting a voice feature from the speech voice signal;

determining a bias to an impression made on the listener by the speech voice signal based on the voice feature;

generating a bias control signal for controlling the bias based on a determination result of the bias and information indicating a preset control direction of the bias; and generating a stimulation control signal for giving external stimulation to the listener in accordance with the bias control signal, and outputting the generated stimulation control signal.

6. A non-transitory computer readable medium storing a program, wherein execution of the program causes a computer to function as the impression formation control device according to claim 1.

\* \* \* \* \*